United States Patent [19]
Fearon

[11] 3,895,818
[45] July 22, 1975

[54] SUPPLEMENTARY WHEEL SET FOR ROAD VEHICLES

[75] Inventor: Robert L. Fearon, Edmondton, Canada

[73] Assignee: London Concrete Machinery Co., London, Canada

[22] Filed: June 3, 1974

[21] Appl. No.: 475,443

[30] Foreign Application Priority Data
Sept. 13, 1973 United Kingdom............... 43175/73

[52] U.S. Cl............ 280/81 R; 180/24.02; 280/34 R
[51] Int. Cl.²............................................ B60S 9/22
[58] Field of Search.......... 280/34, 80 B, 81 R, 401, 280/405 R, DIG. 8, 14 A; 180/24.02; 214/86 A

[56] References Cited
UNITED STATES PATENTS

| | | | |
|---|---|---|---|
| 1,366,771 | 1/1921 | Devencenzi | 280/34 R |
| 1,902,212 | 3/1933 | Bonge | 214/86 A |
| 1,970,967 | 8/1934 | Maust | 280/401 |
| 2,038,156 | 4/1936 | Alexander | 280/401 |
| 3,209,850 | 10/1965 | Fish | 180/14 A |
| 3,235,285 | 2/1966 | Tenenbaum | 280/81 R X |
| 3,610,653 | 10/1971 | Derrwaldt | 280/81 R |
| 3,752,496 | 8/1973 | Meinecke | 280/405 R X |

FOREIGN PATENTS OR APPLICATIONS
1,325,979 8/1973 United Kingdom............... 280/81 R

*Primary Examiner*—David Schonberg
*Assistant Examiner*—Terrance L. Siemens
*Attorney, Agent, or Firm*—Fetherstonhaugh & Co.

[57] ABSTRACT

In a road-going vehicle having rear wheel sets and a tag frame supporting a tag wheel set rearwardly of the vehicle for supporting a portion of the load of the vehicle and thereby removing a portion of the load previously carried by the rear wheel sets when in use, the improvement of mounting means on the vehicle for mounting the tag frame for longitudinal movement with respect to the vehicle between a retracted position closely adjacent the rear end of the vehicle in which the tag wheel set is elevated out of engagement with the road surface and a second extended position spaced rearwardly of the vehicle in which the tag wheel set engages the road surface and supports a portion of the vehicle load. The tag frame is driven in its reciprocating movement by drive means mounted on the vehicle and connected to the tag frame for driving the tag frame longitudinally with respect to the vehicle between the retracted and extended positions.

11 Claims, 8 Drawing Figures

PATENTED JUL 22 1975 3,895,818

SHEET 1

SUPPLEMENTARY WHEEL SET FOR ROAD VEHICLES

FIELD OF INVENTION

This invention relates to road-going vehicles such as trucks incorporating a device for adjusting the proportion of load carried by the various wheel sets of the truck.

PRIOR ART

Since heavy load bearing vehicles such as concrete mixers pose a potential hazard to public highways virtually all jurisdictions have imposed highway regulations in an attempt to reduce the cost of highway maintenance. Although these regulations vary greatly from jurisdiction to jurisdiction, they generally impose an upper limit on the amount of load that can be carried by any one axle. Thus, extremely heavy vehicles usually employ a series of load bearing axles. Furthermore, an upper limit is usually imposed on the amount of weight that can be carried by an entire series of closely spaced axles. Hence, there is a need to apply a portion of the vehicle weight and its load to a region spaced some distance from the primary load bearing region. Furthermore, in addition to providing means for distributing the load over a plurality of widely spaced points or regions, there is also a need for an arrangement whereby the spacing between the load bearing regions may be substantially altered. This is especially desirable in cases where a vehicle leaves a public highway and enters into a job site thus encountering rough terrain. Wide spacing between the load bearing means would in these circumstances be undesirable as the vehicle might become "hung up" on an extremely rough piece of terrain and be unable to provide sufficient traction as to move itself along; thus there is a need under certain circumstances to bring the load bearing axles relatively closely together when circumstances dictate.

In British Specification No. 1,325,979 there is described a self-propelled vehicle for carrying heavy loads along public highways or the like and including an elongated substantially rigid main frame constructed and arranged to support a load thereon. A set of drive wheels are secured to the main frame adjacent rearwardly disposed portions thereof for propelling the vehicle. A set of steerable wheels is connected to the main frame adjacent the front end of the vehicle for effecting directional control of same. An extensible tag frame is connected to the main frame for substantially rectilinear movement relative thereto such that the extensible tag frame may be extended outwardly of the rear portions of the main frame or retracted inwardly in a direction substantially parallel to the longitudinal dimension of the main frame. The connection between the main frame and the extensible tag frame is such that together they form a rigid unit at all positions of the extensible tag frame relative to the main frame. Motor means are operatively connected between the main frame and the extensible tag frame for effecting the retraction and the extension referred to above. A set of load bearing tag wheels is secured to the extensible tag frame such that said tag wheels are brought nearer to or further away from the vehicle drive wheels as the extensible tag frame is retracted or extended relative to the main frame thereby to assist in permitting desired proportions of the weight of a load supported on the vehicle to be carried by the steerable wheels, the set of drive wheels, and the set of tag wheels.

The above mentioned vehicle has the tag wheels arranged and mounted so as to permit self-steering movement thereof relative to the extensible tag frame. Furthermore, means are provided which act between the extensible tag frame and the set of tag wheels for applying a preselected portion of a vehicle load to such tag wheels.

SUMMARY OF INVENTION

The present invention relates to vehicles and equipment therefor similar to that described above; however, in accordance with the present invention the extensible tag frame is constructed and arranged such that as it is extended, for example, the tag wheel set mounted thereon travels in a downwardly and rearwardly inclined path. Upon retraction of the extensible frame, the tag wheel set, of course, travel in an upwardly and forwardly directed inclined path.

The above motion is provided for, in a typical embodiment, by designing the frame members of the tag frame such that rearwardly directed portions thereof are downwardly and angularly directed relative to frontal portions thereof. Suitable guide means are provided which cooperate with the above mentioned frame members such that as the tag frame is extended and retracted the tag wheels follow the path referred to above.

The tag wheels are connected to the extensible tag frame via a suitable suspension arrangement which, in a typical embodiment, permits the application of a desired proportion of the vehicle load to the tag wheels and, which, in the preferred arrangement, also provides for lowering and lifting of said tag wheels relative to the extensible tag frame.

By designing the extensible tag frame as provided in accordance with the present invention, greater versatility is achieved as compared with the structure disclosed in the aforementioned British Specification No. 1,325,979. For example, the structure provided by the present invention permits a much higher lift above ground of the tag wheels in the retracted position. Furthermore, the system can be installed above the main frame of an already existing vehicle. This will allow the extensible tag frame sub-combination to be installed on virtually any truck regardless of make. Thus, the invention can be readily used on ready mix concrete trucks, so-called "block" trucks or flat bed trucks, dump trucks and the like. The load transfer function is much the same as that described in the above mentioned British Specification, increases in wheel base being made by adjusting the position of the extensible tag frame thus allowing adaption of the unit to the requirements of various jurisdictions regarding axle spacing and loadings.

In accordance with a further aspect of the present invention, there is provided a dump truck in which the lower structural members of the dump box are arranged to receive the extensible tag frame so that in the retracted position the tag frame will tip with the dump box.

In accordance with a preferred embodiment of the present invention, there is provided an improvement in a road-going vehicle having rear wheel sets supporting a chassis comprising a tag frame supporting a tag wheel set rearwardly of the chassis, mounting means for mounting the tag frame for longitudinal movement with respect to the chassis between a retracted position closely adjacent the rear end of the chassis in which the tag wheel set is elevated out of engagement with the road surface and a second extended position spaced rearwardly of said chassis in which said tag wheel set engages the road surface and supports a portion of the chassis load, drive means is mounted on the chassis and connected to the tag frame for driving the tag frame longitudinally with respect to the chassis between said retracted and extended positions.

The various features of the invention will be better understood from the following description of the preferred embodiments of same, reference being had to drawings wherein.

With reference to the drawings, the reference numeral 10 refers generally to a ready-mix concrete truck according to an embodiment of the present invention. The truck 10 has a chassis 12 which includes a pair of longitudinally extending beam members 14 which are secured at their rear end by a transverse beam member 16. In the embodiment illustrated, two wheel sets 18 each having axles 20 are mounted on suspension units 22 depending from the longitudinal beam members 14. The wheel sets 18 are positioned so that they underlie the load carrying unit of the vehicle such as the rotary mixing drum illustrated in chain lines and identified by the reference numeral 24.

The front end of the vehicle may be in the form of any conventional front end including a power unit and one or more steerable wheel sets.

A tag frame 26 is mounted on the chassis 12 as will be described hereinafter and projects rearwardly therefrom. The tag frame 26 supports a tag wheel set 28. The tag frame 26 consists of a pair of longitudinally extending beam members 30 which are connected at their rear end by a transverse bumper beam 32 and intermediate the ends thereof by transverse U-shaped channel member 34.

The tag wheel set 28 is mounted on the tag frame 26 by means of an adjustable suspension mechanism which is adapted to adjustably proportion the amount of the load which is carried by the tag frame wheel set in use. The tag wheel set includes an axle member 36 of any conventional well known construction which includes at its outer ends suitable king-pin mountings 40 which serve to mount wheels 38 thereon. The wheels 38 are mounted by means of the king-pin assemblies 40 so as to be self-steering. Tie rod 42 is connected to steering links 44 secured to their respective wheels 38 so that the self-steering motion of the two wheels 38 takes place in unison. In order to prevent any unwanted shimmy of the wheels 38, suitable damper assemblies 46 are interconnected between the axle 36 and the tie rod 42.

In order that the axle 36 may support any desired proportion of the vehicle load, a pair of conventional load bellows 48 (FIG. 2, 4) are mounted between the axle 36 and longitudinal beam members 30. The load bellows 48 may be of any suitable commercially available construction. A support post 50 extends downwardly from the lower end of each load bellows 48 and is pivotably connected to the axle 36 by means of a pivot pin 52 which extends through a pair of short lugs which extend upwardly from the axle 36.

The tag wheel set suspension system includes a sub-frame 53 which is securely welded to transverse U-shaped channel 34. The sub-frame 53 has a pair of lug members 54 projecting from the lower end. A pair of trailing link arms 58 are pivotally mounted on lugs 54 by means of pivot pin 56. The other ends of the trailing link arms 58 are secured to the tag axle 36 by welding or the like. A lift bellows 60 is mounted in the channel-shaped member 34 and connected by means of a tie rod or tie rope 62 to the trailing link arms 58. Preferably the load applying bellows 48 are connected to the lift bellows 60 such that when the air pressure is released from the load bellows 48 the air pressure is applied to the lift bellows 60 to cause the lift bellows 60 to lift the trailing link arm 58. Similarly, when the air pressure is applied to the load bellows 90, the air pressure in the lift bellows is released.

Figure 1:
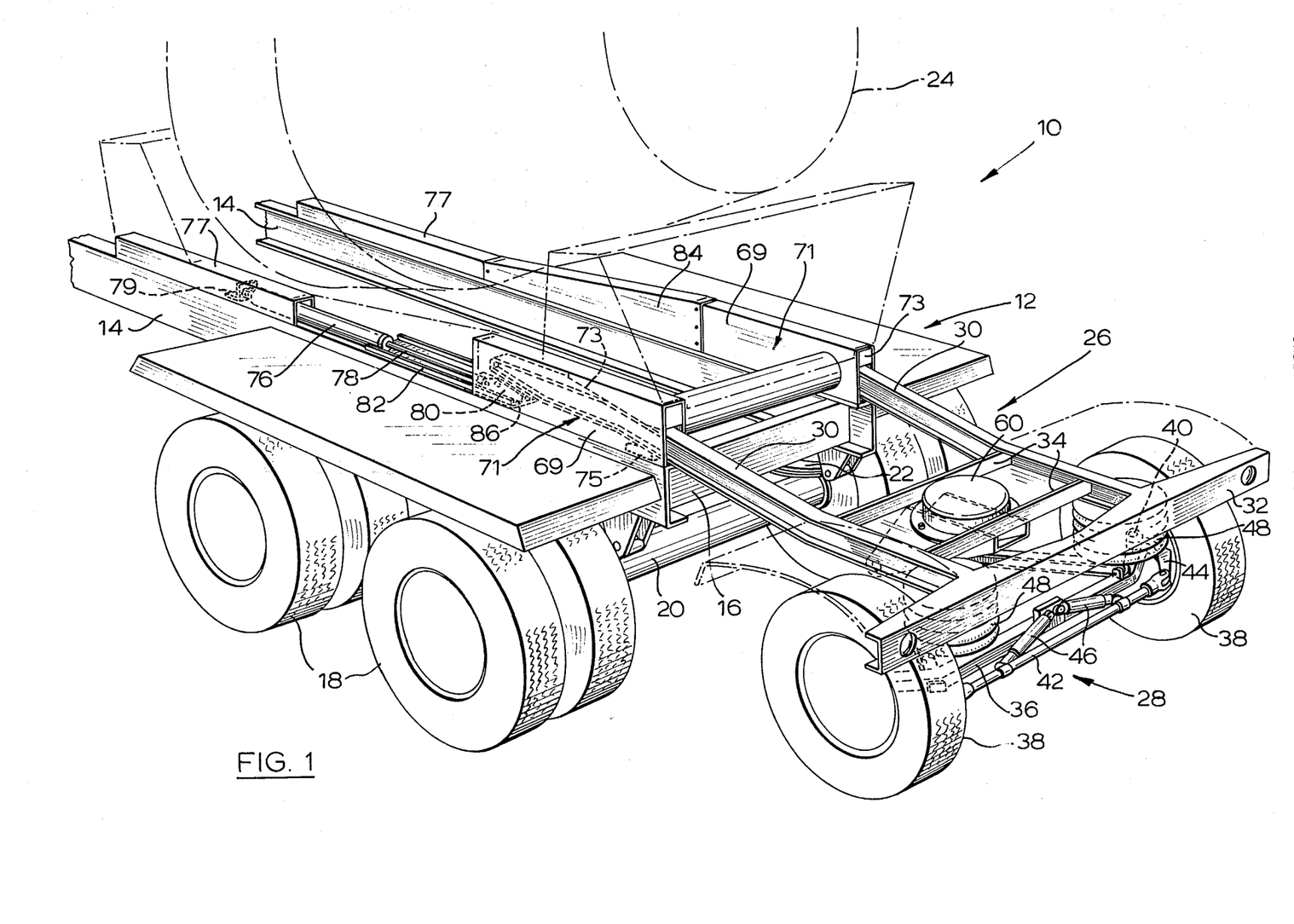
FIG. 1 is a pictorial view illustrating the manner in which a tag frame is mounted on the rear end of a ready-mix concrete truck.
Figures 2, 3:
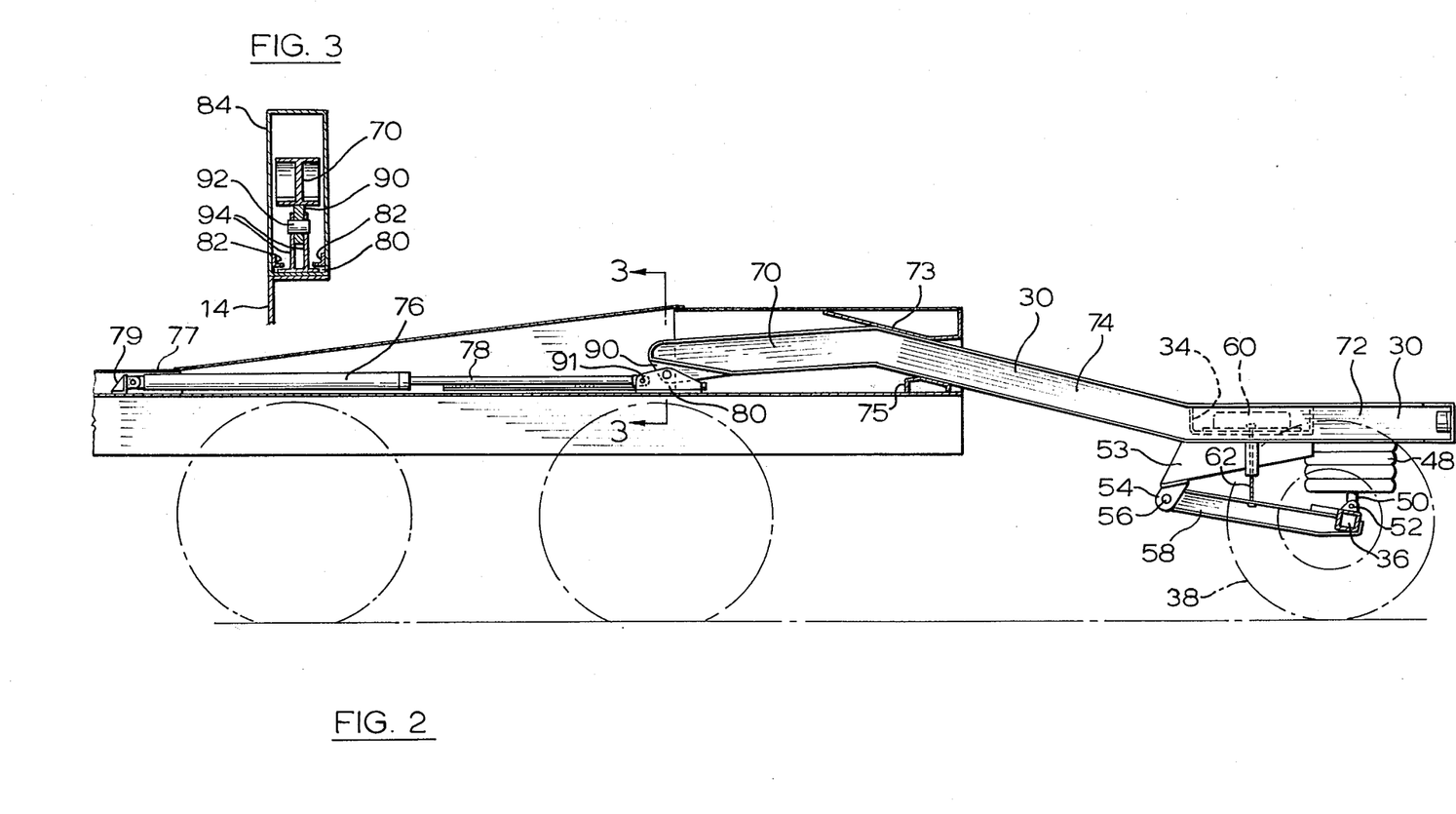
FIG. 2 is a side view illustrating the tag frame in the extended position with its wheel set engaging the roadway.
FIG. 3 is a sectional view taken along the line 3—3 of FIG. 2.

The tag frame beams 30 are I-shaped in cross-section and they have a longitudinal configuration which is in the form of an elongated Z, as clearly shown in FIG. 2, including a first longitudinally extending section 70 at the front end thereof and a second longitudinally extending section 72 at the rear end thereof connected to one another by means of an intermediate section 74 which is rearwardly and downwardly inclined between sections 72 and 74.

A feature of the tag frame of the present invention is the fact that it may be mounted on the chassis of existing roadgoing vehicles such as concrete mixer trucks. In order to mount the tag frame on the chassis, a pair of slipway members 71 are mounted on and secured with respect to the longitudinal frame members 14 of the chassis 12. Each slipway device 71 includes a box-shaped frame member 69 which is secured to the chassis and upper guide member 73 and lower guide member 75 are mounted within each of the box frame members 69 and are spaced from one another a distance sufficient to permit the tag frame beams 30 to pass therebetween.

The reciprocal movement of the tag frame 26 is effected by means of a pair of hydraulic cylinders 76. Open-ended box section members 77 are mounted on the longitudinal beams 14 of the chassis and one end of each hydraulic cylinder 76 is mounted within each box-shaped member 77 by means of an angle bracket 79. Each of the hydraulic cylinders 76 has a piston rod 78 projecting outwardly therefrom and connected at its other end to a slide member 80. The slide member 80 has a pair of bearing pads 81 mounted on the under surface thereof and disposed between the slide 80 and the upper face of the longitudinally extending beam member 14. The bearing pads 81 are preferably made from a suitable bearing material such as bronze or the like. In order to prevent lifting of the slide member 80, a pair of guide rails 82 are located one on either side of the slide member 80 and disposed above the side edges thereof. The guide rails 82 extend for a length equal to the total length of travel of the slide member and reciprocating between its extended position and its retracted position. The guide rails 82 are mounted on the side walls of the cover 84 and the side walls of the box section member 69. The slide member 80 has a pair of vertically extending walls 94 which are connected to the leading end of the piston rod 78 of the hydraulic cylinder 76 by means of a connecting pin 91 so that the slide member 80 may be reciprocally driven by means of the hydraulic cylinder 76. Each of the tag frame members 30 has a flange 90 at the under end thereof which is adapted to fit between the walls 94 of the slide and to be pivotally connected to the slide by means of a pivot pin 92.

Figure 4:
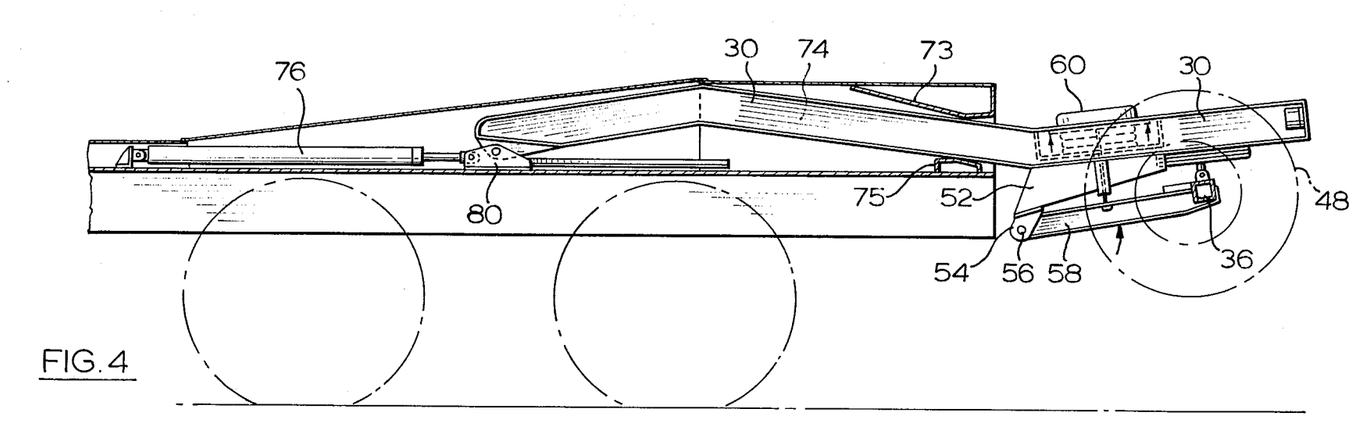
FIG. 4 is a side view similar to FIG. 2 illustrating the tag frame in the retracted elevated position.

The tag frame is normally located in the storage position illustrated in FIG. 4 of the drawings when not in use. In order to bring the tag frame into use, the hydraulic cylinder 76 is activated to move the slide member 80 rearwardly. The slide member 80 in turn causes the tag frame member 30 to be pushed rearwardly. As the tag frame 30 moves rearwardly, the angularly inclined portion 74 passes through the slipway formed between the guide rails 73 and 75 and is thereby directed downwardly during its longitudinal movement until it arrives at the position illustrated in FIG. 3 of the drawings. When in this position, the elevating bellows 60 is deactivated so that the trailing link arm 58 is lowered so that the wheel 38 assumes the position shown in FIG. 3. The loading bellows is activated so that the wheel 38 is forced downwardly into engagement with the roadway until the required proportion of the load carried by the vehicle is transferred to the tag wheel set. The amount of load carried by the tag wheel set is regulated by the load bellows in a well known manner.

It will be noted that the guide rails 82 prevent the slide member from rising under the influence of the bending moment applied by the tag wheel set as it is moved rearwardly from the position shown in FIG. 4 and the angularly inclined surface of the upper guide rail 73 of the slipway is parallel to the angularly inclined portion 74 of the tag frame 30 so that the load carried by the tag frame is transmitted to the vehicle chassis over the full length of the inclined surface of the upper guide rail 73. It will also be noted that when the tag frame is in the retracted position shown in FIG. 3, the angularly inclined portion 74 is intimately held by the guide rails 73 and 75 so that it is not free to pivot about the inner connection with the slide member 80.

Figure 5:
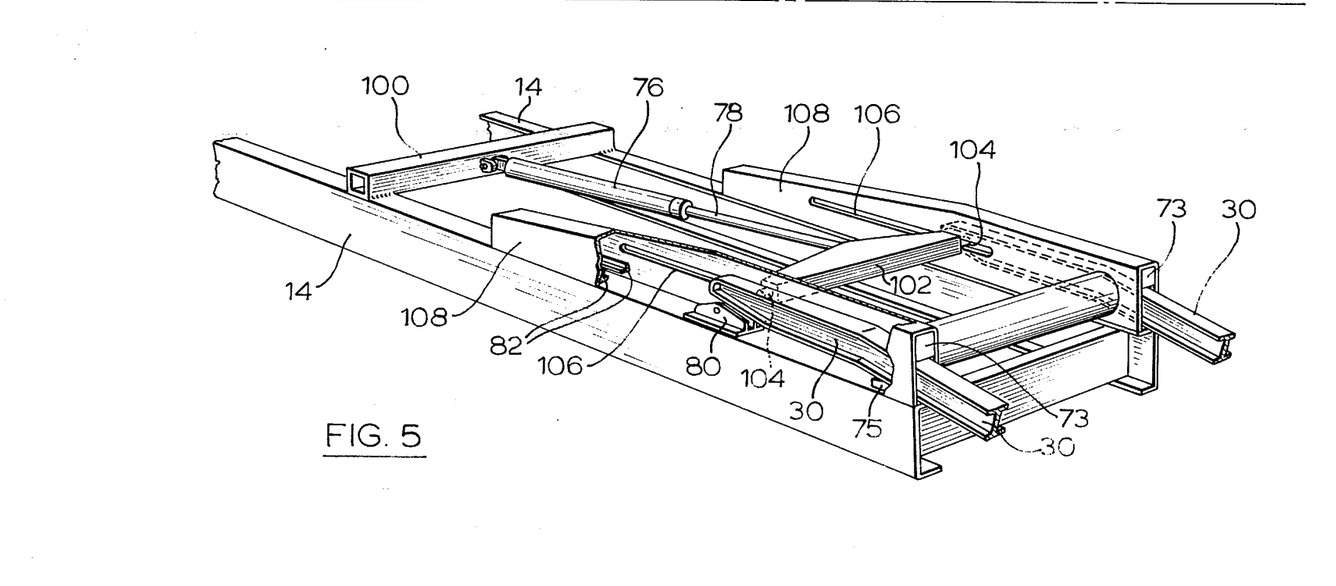
FIG. 5 is a pictorial view illustrating the manner in which the inner end of the tag frame is mounted for reciprocation on the vehicle chassis.

Alternative reciprocating drive mechanism is illustrated in FIG. 5 of the drawings. In this embodiment, a single hydraulic cylinder 76 is mounted on a cross beam member 100 which extends transversely between the longitudinal beam members 14 of the chassis. The piston rod 78 is connected at its inner end to a sliding head member 102. The head 102 has shafts 104 at either end thereof which project through longitudinal slots 106 formed in the side walls of box-shaped channel members 108 mounted on each of the longitudinal beam members 14. Slide members 80 are again mounted on flanges 90 which project from the inner ends of the tag frame members 30 and guide rails 82 again prevent the slide member 80 from rising under the influence of the weight of the tag frame. Again the slipway formed by the combination of upper guide rail 73 and lower guide rail 75 controls the raising and lowering of the tag frame in response to reciprocal movement of the tag frame.

Figure 6:
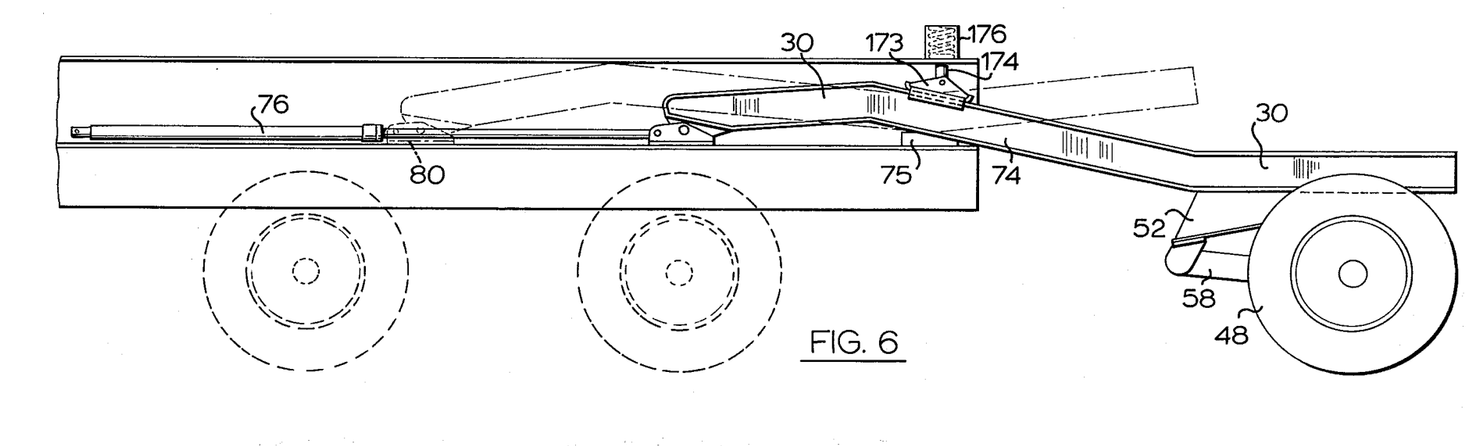
FIG. 6 is a side view similar to FIG. 2 illustrating a further embodiment of the present invention.

FIG. 6 of the drawings illustrates an alternative embodiment of the present invention in which like parts are identified by like numerals. The difference between the embodiment illustrated in FIG. 6 and that illustrated in FIG. 4 is that the upper guide rail 73 of FIG. 4 has been replaced by a movable guide bar 173 which is mounted on the end of a shaft 174 of a pneumatic or hydraulic cylinder 176. The hydraulic cyclinder 176 is double-acting so that it may be used to apply upward or downward pressure to the tag frame. The guide bar 173 has edge portions extending over and under the flanges of the I-section of the tag frame so that both a lifting and lowering pressure may be applied to the tag frame. The cylinder 176 is connected by suitable means to a source of hydraulic fluid or the like and provided with suitable control means for controlling the direction in which the forces applied by the cylinder 176 act in use.

Figure 7:
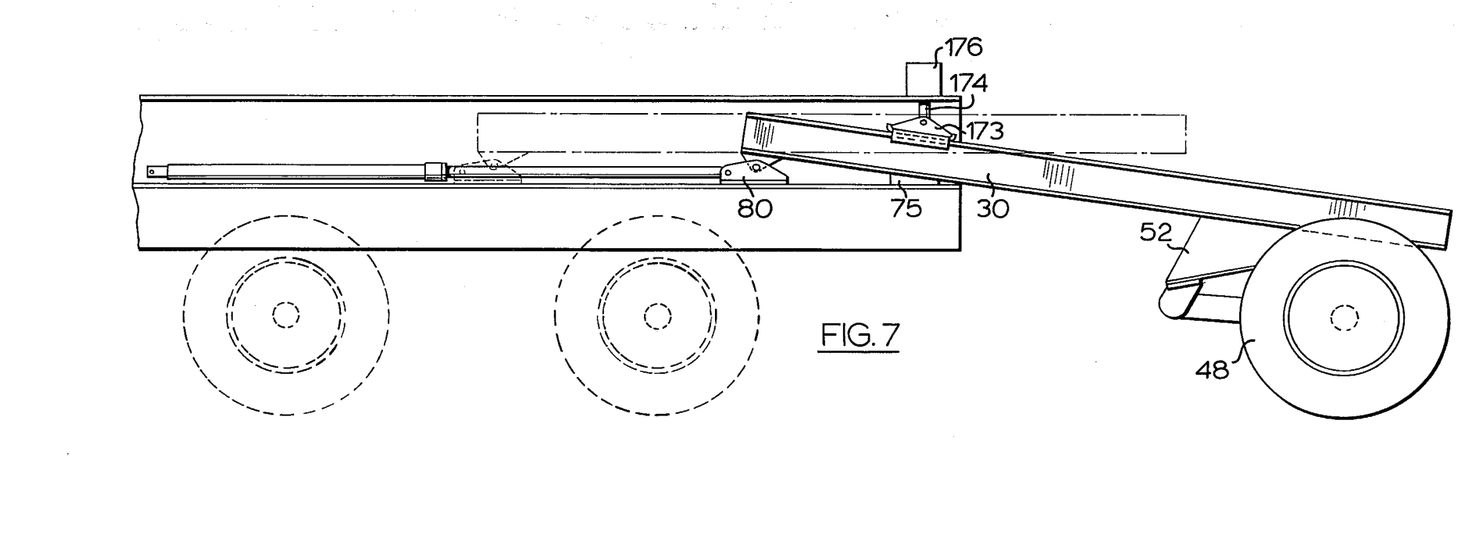
FIG. 7 is a side view similar to FIG. 6 illustrating a still further embodiment of the present invention.

FIG. 7 illustrates a further embodiment of the invention in which like parts are identified by like numerals with respect to FIGS. 4 and 6. The embodiment of the invention illustrated in FIG. 7 differs from that illustrated in all of the previous examples in that the tag frame 30 is straight. It is possible to use a straight frame in this embodiment by reason of the fact that the guide bar 173 may float upwardly and downwardly as required during the extension and retraction of the tag frame. It will be seen that the provision of the floating guide bar eliminates the necessity of having the elongated Z-shaped tag frame previously described. It will be noted that as the slide member 80 approaches the rear end of the chassis, the extent to which the tag frame is downwardly inclined will increase rapidly.

Figure 8:
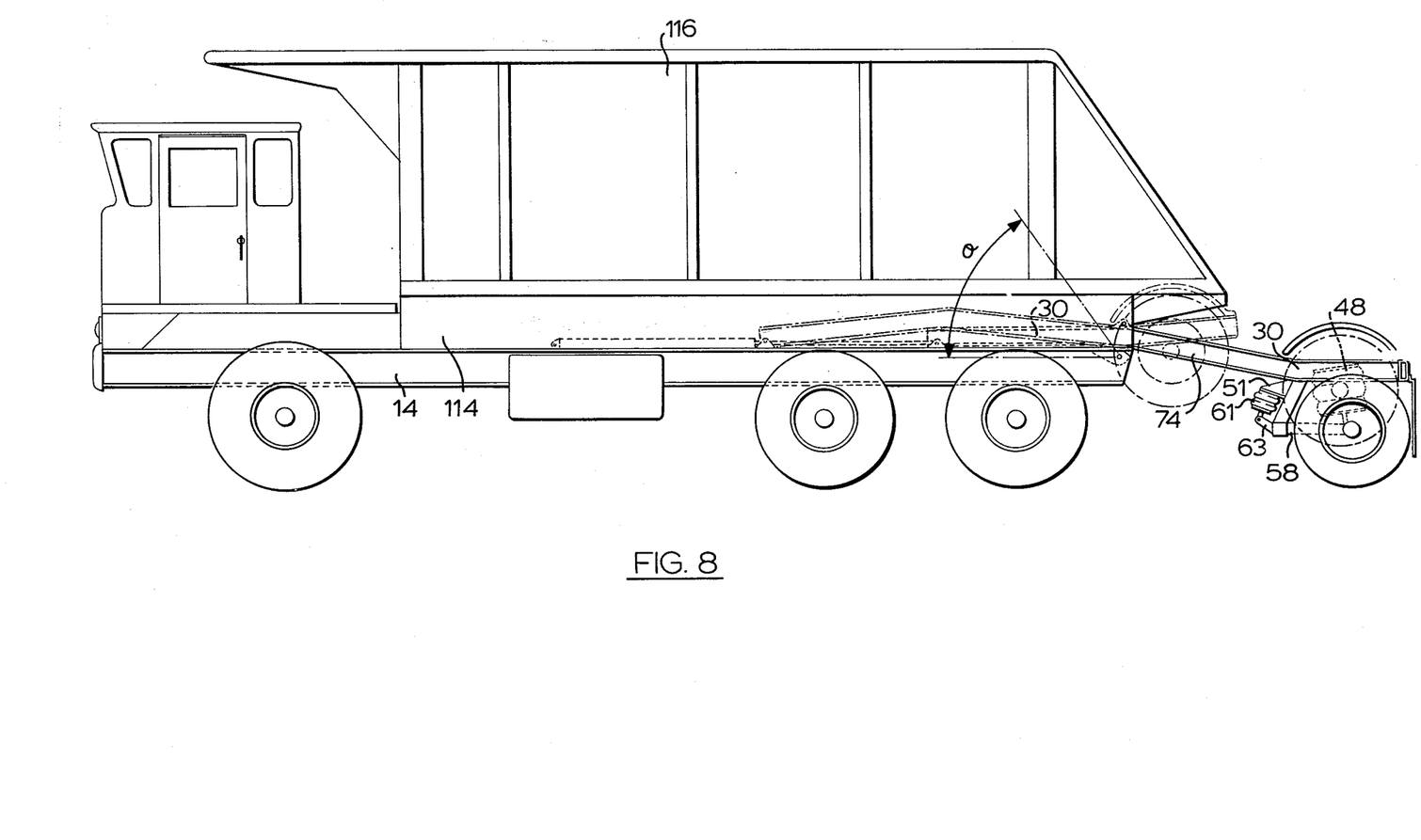
FIG. 8 is a side view similar to FIG. 7 illustrating the tag frame mounted on a dump truck.

The present invention is not limited to use in association with concrete mixers and has application in other road-going vehicles including conventional trucks and dump trucks. FIG. 8 illustrates a further embodiment of the invention wherein the tag frame is mounted on a dump truck. In this embodiment the tag frame is mounted on beams 114 which are carried by the dump body 116. When the tag frame is in the retracted position, the dump body may tip through the angle $\theta$ in a conventional manner with the tag wheel sets 48 remaining clear of the ground. Preferably the hydraulic circuit which controls the tipping action includes suitable controls for preventing the activation of the tipping circuit when the tag frame is in the extended position. FIG. 8 serves to illustrate an alternative form of mechanism for applying pressure to the guide wheel sets. In this embodiment lift bellows 61 are connected between the frame member 51 and an extension arm 63 which is an extension of the trailing link arm 58. By activating the lift bellows 61 when the tag frame is in the retracted position, increased clearance is provided to facilitate the tipping action.

From the foregoing it will be apparent that the present invention provides a tag frame mechanism which may be transported when not in use in a position spaced a substantial distance above the road surface and which, when in use, may be located in a position sufficiently close to the road surface to permit loading of the wheel set carried thereby in order to transfer a portion of the vehicle load to the tag frame wheel set. This is achieved in a mechanism wherein the tag frame is drawn into the chassis of the vehicle when not in use and extended therefrom by means of a simple reciprocating drive mechanism such that the frame moves in a plane which is inclined outwardly and downwardly in a direction away from the rear end of the vehicle during its movement between its extended and retracted positions. A major portion of the mechanism including the guide means which effects the guiding of the tag frame is enclosed within enclosures so that it is protected by the enclosures.

From the foregoing it will be apparent that the rearward and downwardly inclined direction of the tag frame requires the tag frame to be pivotally mounted at its inner end on a moving slide and some form of guide means at the rear end of the vehicle for holding the frame downwardly when in its extended position. As indicated in the foregoing examples, the means for holding the frame downwardly may be in the form of a fixed slipway as illustrated in FIG. 2 of the drawings or in the form of a floating pressure applicator as illustrated in FIG. 6 and 7 of the drawings. As also shown in FIGS. 2 and 7 of the invention the tag frame may either have a Z-shaped elongated configuration or it may be a simple straight frame, the Z-shaped configuration being required when a fixed slipway is used and the straight frame being usable when a floating guide is provided.

These and other modifications of the present invention will be apparent to those skilled in the art without departing from the scope of the invention.

The embodiments of the invention in which an exclusive property or privilege is claimed are defined as follows:

1. In a road-going vehicle having rear wheel sets supporting a chassis, the improvement of
   a. a tag frame supporting a tag wheel set rearwardly of said chassis, the frame having longitudinal beam means including intermediate beam portions and forward ends;
   b. mounting means on said chassis for mounting said tag frame beam means for longitudinal movement with respect to said chassis between a retracted position where the tag wheel set is closely adjacent the rear end of said chassis and in which said tag wheel set is elevated out of engagement with the road surface, and a second extended position spaced rearwardly of said chassis in which said tag wheel set engages the road surface and supports a portion of the chassis load, said mounting means including slide members carried by the chassis and horizontally pivotally connected to the forward ends of said beam means and further including slipway means fixed with respect to the chassis behind the slide members and including guide means confining said intermediate beam portions vertically and horizontally at the slipway, the slipway means and the slide means being mutually oriented such that the rear end of the tag frame supporting the tag wheel set is raised when the tag frame is retracted and lowered when the tag frame is extended; and
   c. drive means mounted on said chassis and connected to said slide members for driving said tag frame longitudinally with respect to said chassis between said retracted and extended positions.

2. A road-going vehicle as claimed in claim 1, wherein said slipway means has upper and lower guide surface means which are downwardly inclined in a direction extending rearwardly of said chassis, said tag frame beam means having said intermediate portions rearwardly and downwardly inclined at an angle which corresponds to the inclination of said guide surfaces, said inclined intermediate portions engaging said guide surface means of said slipway means during reciprocal movement between said extended and retracted positions whereby said rear end of the tag frame is downwardly directed by said slipway means in response to longitudinal movement with respect to said frame to said extended position and upwardly directed in response to movement towards said retracted position.

3. A road-going vehicle as claimed in claim 2, wherein the length of said intermediate portions of the beam means is substantially equal to the length through which said drive means drives the slide means on the chassis during longitudinal reciprocation with respect to said chassis.

4. A road-going vehicle as claimed in claim 2 wherein said guide surface means includes upper and lower guide blocks disposed within said slipway means above and below said beam means respectively, a lower surface of said guide block means forming an upper guide surface restraining said tag frame against rotation about said pivotal connection with said slide means in a direction away from the road when said frame is in the extended position and an upper surface of said lower guide block forming a lower guide surface restraining said tag frame against rotation about said pivotal connection with said slide in a direction towards the road when said frame is in the retracted position.

5. A road-going vehicle as claimed in claim 4 wherein said beam means comprises a pair of transversely spaced parallel beam members.

6. A road-going vehicle as claimed in claim 1, wherein said tag frame wheel set includes adjustable suspension means for varying the proportion of the vehicle load carried as a supplementary load by said wheel set.

7. In a road-going vehicle having rear wheel sets supporting a chassis, the chassis including two spaced parallel longitudinally extending frame members, the improvement of
   a. guide rail means carried by each of said longitudinally extending frame members, each of said guide rail means including upper and lower guide rail means disposed in a spaced parallel relationship defining an angular slipway therebetween which extends downwardly and rearwardly with respect to said chassis frame members;
   b. a tag frame supporting a tag wheel set rearwardly of said chassis, said tag frame including a pair of longitudinally extending beam members said beam members each having a front end and the members being arranged in a parallel side by side relationship and each including an intermediate beam portion located within a slipway in sliding engagement with said upper and lower guide rails;
   c. drive means mounted on said chassis and connected to the front ends of said tag frame beam members for driving said tag frame longitudinally of said chassis between an extended position in which the tag wheel set is spaced a substantial distance rearwardly of the chassis and a retracted position in which the tag wheel set is closely adjacent the rear end of the chassis;

d. the intermediate portion of each of said frame beam members being angularly inclined to slide within said slipways during movement of said tag frame between said extended and retracted positions, said angularly inclined portion being downwardly and rearwardly inclined with respect to said longitudinal extent of said chassis such that said beam members are directed downwardly by said slipway means in response to movement towards said extended position and directed upwardly in response to movement towards said retracted position, and e. means carried by said tag frame means for transferring a portion of the vehicle load to the tag wheel set when in said extended position.

8. In a road-going vehicle having rear wheel sets supporting a chassis, the improvement of a. a tag frame supporting a tag wheel set rearwardly of said chassis;

b. mounting means on said chassis for mounting said tag frame for longitudinal movement with respect to said chassis between a retracted position closely adjacent the rear end of said chassis in which said tag wheel set is elevated out of engagement with the road surface and a second extended position spaced rearwardly of said chassis in which said tag wheel set engages the road surface and supports a portion of the chassis load, c. drive means mounted on said chassis and connected to said tag frame for driving said tag frame longitudinally with respect to said chassis between said retracted and extended positions, and d. said mounting means including slipway means at the rear end of said chassis, said tag frame including longitudinal beam means slidably mounted in said slipway, said slipway means including adjustable upper guide pad means operable to apply a hold-down force to said tag frame when in said extended position and releasable to facilitate withdrawal of said frame to said retracted position.

9. A road-going vehicle as claimed in claim 8 wherein said longitudinal beam means has an elongated Z-shaped longitudinal configuration with the central angularly inclined portion thereof slidable in said slipway during movement of said beam means between said extended and retracted position.

10. A road-going vehicle as claimed in claim 8 wherein said longitudinal beam means is straight, said adjustable upper guide pad means being elevated upon retraction of said longitudinal beam means.

11. In a road-going vehicle having rear wheel sets supporting a chassis and a dump truck container body pivotably supported by said chassis, the improvement of a. a tag frame supporting a tag wheel set rearwardly of said chassis, b. mounting means on said container body for mounting said tag frame for longitudinal movement with respect to said container body between a retracted position closely adjacent the rear end of said container body in which said tag wheel set is elevated out of engagement with the road surface and a second extended position spaced rearwardly of said container body in which said tag wheel set engages the road surface and supports a portion of the container body load, c. drive means mounted on said container body and connected to said tag frame for driving said tag frame longitudinally with respect to said container body between said retracted and extended positions.

* * * * *